(12) United States Patent
Setoma

(10) Patent No.: US 12,542,155 B2
(45) Date of Patent: Feb. 3, 2026

(54) MAGNETIC DISK DEVICE HAVING PIEZOELECTRIC ELEMENT

(71) Applicants: Kabushiki Kaisha Toshiba, Tokyo (JP); Toshiba Electronic Devices & Storage Corporation, Tokyo (JP)

(72) Inventor: Shunya Setoma, Yokohama Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 0 days.

(21) Appl. No.: 18/583,021

(22) Filed: Feb. 21, 2024

(65) Prior Publication Data

US 2025/0037738 A1    Jan. 30, 2025

(30) Foreign Application Priority Data

Jul. 26, 2023 (JP) ................. 2023-121461

(51) Int. Cl.
*G11B 5/48* (2006.01)
*H10N 30/50* (2023.01)
*H10N 30/87* (2023.01)

(52) U.S. Cl.
CPC ............ *G11B 5/4833* (2013.01); *G11B 5/486* (2013.01); *G11B 5/4873* (2013.01); *H10N 30/50* (2023.02); *H10N 30/872* (2023.02)

(58) Field of Classification Search
None
See application file for complete search history.

(56) References Cited

U.S. PATENT DOCUMENTS

| | | | |
|---|---|---|---|
| 5,745,319 A * | 4/1998 | Takekado | G11B 5/4833 |
| 8,760,813 B2 | 6/2014 | Arai | |
| 10,957,351 B2 * | 3/2021 | Nesori | H10N 30/875 |
| 10,984,825 B2 | 4/2021 | Suzuki | |
| 11,121,647 B2 | 9/2021 | Ee et al. | |
| 11,348,609 B2 * | 5/2022 | Nesori | G11B 5/4853 |
| 11,694,715 B2 * | 7/2023 | Suzuki | G11B 5/4853 |
| | | | 360/246.1 |
| 12,211,528 B2 * | 1/2025 | Setoma | H10N 30/206 |
| 2020/0265866 A1 * | 8/2020 | Suzuki | G11B 5/484 |
| 2020/0286511 A1 * | 9/2020 | Nesori | G11B 5/4833 |
| 2020/0327904 A1 * | 10/2020 | Glaess | G11B 5/596 |
| 2020/0381013 A1 * | 12/2020 | Suzuki | G11B 5/4873 |
| 2021/0210117 A1 * | 7/2021 | Suzuki | G11B 5/4873 |
| 2022/0076698 A1 * | 3/2022 | Nesori | G11B 5/4873 |

(Continued)

*Primary Examiner* — William J Klimowicz
(74) *Attorney, Agent, or Firm* — Kim & Stewart LLP

(57) ABSTRACT

A disk device according to one embodiment includes a magnetic disk, a magnetic head, a piezoelectric element, a flexure, a first bond, and a second bond. The piezoelectric element includes a first piezoelectric body, a first electrode and a second electrode on a first surface of the first piezoelectric body, and a third electrode on a second surface of the piezoelectric body. The third electrode is connected to the second electrode. A first pad and a second pad are disposed on an outer surface of the flexure. A first through hole is open to a part of the first pad. The first electrode and the third electrode overlap with the part. The first bond joins the first pad and the first electrode together and is partly accommodated in the first through hole. The second bond joins the second pad and the second electrode together.

15 Claims, 8 Drawing Sheets

(56) References Cited

U.S. PATENT DOCUMENTS

| | | | |
|---|---|---|---|
| 2023/0029666 A1* | 2/2023 | Suzuki | G11B 5/4853 |
| 2023/0298622 A1* | 9/2023 | Setoma | G11B 5/4833 |
| | | | 360/294.4 |
| 2024/0096379 A1* | 3/2024 | Suzuki | G11B 5/484 |

* cited by examiner

MAGNETIC DISK DEVICE HAVING PIEZOELECTRIC ELEMENT

CROSS-REFERENCE TO RELATED APPLICATIONS

This application is based upon and claims the benefit of priority from Japanese Patent Application No. 2023-121461, filed on Jul. 26, 2023; the entire contents of which are incorporated herein by reference.

FIELD

Embodiments described herein relate generally to a disk device.

BACKGROUND

A disk device such as a hard disk drive typically includes magnetic disks and magnetic heads that read and write information from and to the corresponding magnetic disks. Each of the magnetic heads is mounted on a flexible flexure. A piezoelectric element is further attached to the flexure with a bond such as a conductive adhesive. The piezoelectric element works to adjust the position of the magnetic head by deforming the flexure.

The piezoelectric element has a piezoelectric body in-between two electrodes. When mounting one electrode of the piezoelectric element on a flexure pad using a bond, the bond is pressed between the piezoelectric element and the flexure. While being pressed, the bond may spread to the other electrode along the side surface of the piezoelectric element.

DETAILED DESCRIPTION

A disk device according to one embodiment includes a magnetic disk, a magnetic head, a piezoelectric element, a flexure, a conductive, first bond, and a conductive, second bond. The magnetic head is configured to read and write information from and to the magnetic disk. The piezoelectric element includes a first piezoelectric body, a first electrode, a second electrode, and a third electrode. The first electrode is disposed on a first surface of the first piezoelectric body. The second electrode is disposed on the first surface away from the first electrode in a first direction along the first surface. The third electrode is disposed on a second surface of the first piezoelectric body and is connected to the second electrode. The second surface is opposite to the first surface. The flexure is provided with a first through hole. The magnetic head is mounted on the flexure. The flexure includes an outer surface, a first pad, and a second pad. The outer surface faces the first electrode and the second electrode. The first pad is disposed on the outer surface. The second pad is disposed on the outer surface away from the first pad in the first direction. The first through hole is open to a part of the first pad. The first electrode and the third electrode overlap with the part in a second direction which the first surface faces. The first bond joins the first pad and the first electrode together and is partly accommodated in the first through hole. The second bond joins the second pad and the second electrode together.

First Embodiment

In the following, a first embodiment will be described with reference to FIGS. 1 to 5. Note that in the present specification, components according to embodiments and descriptions of the components may be recited in a plurality of expressions. The components and the description thereof are examples, and are not limited by the expressions of the present specification. The components may also be identified with names different from those in the present specification. In addition, the components can be described by the expressions different from the expressions in the present specification.

In the following description, "suppressing" is defined as, for example, preventing occurrence of an event, an action, or an influence, or reducing a degree of the event, the action, or the influence.

Figure 1:
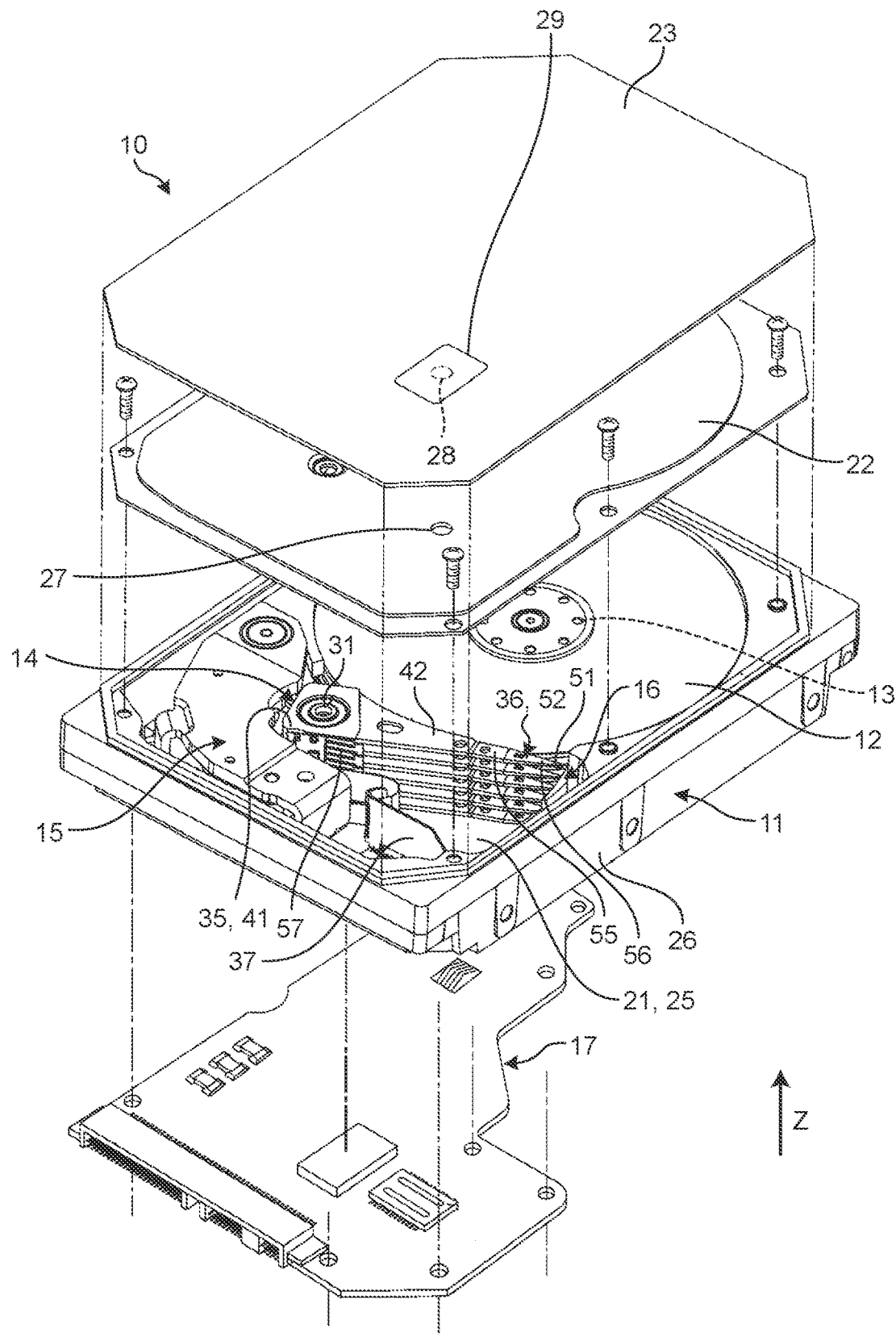
FIG. 1 is an exemplary perspective view illustrating an HDD according to a first embodiment in an exploded manner.

FIG. 1 is an exemplary perspective view illustrating a hard disk drive (HDD) 10 according to a first embodiment in an exploded manner. The HDD 10 is an example of a disk device, and may also be referred to as an electronic apparatus, a storage device, an external storage device, or a magnetic disk device.

The HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The magnetic disk 12 may also be referred to as a disk or a platter.

As illustrated in FIG. 1, in the present specification, a Z axis and a Z direction are defined for convenience. The Z axis is provided along a thickness of the HDD 10. The Z direction is a direction along the Z axis and includes a +Z direction indicated by an arrow of the Z axis and a −Z direction which is a direction opposite to the direction indicated by the arrow of the Z axis.

The housing 11 includes a base 21, an inner cover 22, and an outer cover 23. Note that the housing 11 is not limited to this example. Each of the base 21, the inner cover 22, and the outer cover 23 is made of a metal material such as an aluminum alloy. The materials of the base 21, the inner cover 22, and the outer cover 23 may be different from each other.

The base 21 has a substantially rectangular parallelepiped box shape opened in the +Z direction. The base 21 accommodates the plurality of magnetic disks 12, the spindle motor 13, the HSA 14, the VCM 15, and the ramp load mechanism 16.

The base 21 has a bottom wall 25 and a side wall 26. The bottom wall 25 has a substantially rectangular (quadrangular) plate shape arranged to be substantially orthogonal to the Z direction. The side wall 26 protrudes in a substantially +Z direction from an edge of the bottom wall 25 and has a substantially rectangular frame shape.

The inner cover 22 is attached to an end of the side wall 26 in the +Z direction with, for example, a screw to close the base 21. The outer cover 23 covers the inner cover 22 and is attached to the end of the side wall 26 in the +Z direction by welding, for example.

The inner cover 22 is provided with a vent 27. Furthermore, the outer cover 23 is provided with a vent 28. After the components are attached to the inside of the base 21 and the inner cover 22 and the outer cover 23 are attached to the base 21, air inside the housing 11 is removed from the vents 27 and 28. Furthermore, the inside of the housing 11 is filled with a gas different from air.

The gas filling the housing 11 is, for example, a low density gas having a density lower than that of air, an inert gas having low reactivity, or the like. For example, helium is filled inside the housing 11. Note that the inside of the housing 11 may be filled with another fluid. The inside of the housing 11 may be maintained at vacuum, a low pressure close to vacuum, or a negative pressure lower than atmospheric pressure.

The vent 28 of the outer cover 23 is closed by a seal 29. The seal 29 hermetically seals the vent 28 and restricts the fluid inside the housing 11 from leaking from the vent 28 to the outside of the housing 11.

The plurality of magnetic disks 12 are arranged substantially orthogonal to the Z direction. The plurality of magnetic disks 12 are arranged in the Z direction with gaps therebetween. A magnetic recording layer is provided on a surface of the magnetic disk 12.

The spindle motor 13 supports and integrally rotates the plurality of magnetic disks 12. The plurality of magnetic disks 12 are held at a hub of the spindle motor 13 by, for example, a clamp spring.

The housing 11 is provided with a support shaft 31 spaced apart from the magnetic disk 12. The support shaft 31 extends, for example, in the substantially +Z direction from the bottom wall 25 of the housing 11. The HSA 14 is rotatably supported by the support shaft 31.

The HSA 14 has a carriage 35, a plurality of head gimbal assemblies (HGA) 36, and a flexible printed circuit board (FPC) 37. The carriage 35 includes an actuator block 41 and a plurality of arms 42.

The actuator block 41 and the plurality of arms 42 are integrally formed of, for example, an aluminum alloy. Note that the materials of the actuator block 41 and the arms 42 are not limited to this example.

The actuator block 41 is supported by the support shaft 31 via a bearing so as to be rotatable about the support shaft 31, for example. This enables the carriage 35 to rotate about the support shaft 31.

The plurality of arms 42 protrude from the actuator block 41 substantially in parallel in a direction substantially orthogonal to the Z direction. Note that the HSA 14 may be divided, and the arm 42 may protrude from each of the plurality of actuator blocks 41.

The plurality of arms 42 are arranged in the Z direction with a gap interposed therebetween. When the carriage 35 including the arms 42 rotates in one direction about the support shaft 31, each of the plurality of arms 42 can enter a gap between two adjacent magnetic disks 12 among the plurality of magnetic disks 12. When the carriage 35 rotates in the other direction, each of the plurality of arms 42 can come out of the gap between the two adjacent magnetic disks 12.

Figure 2:
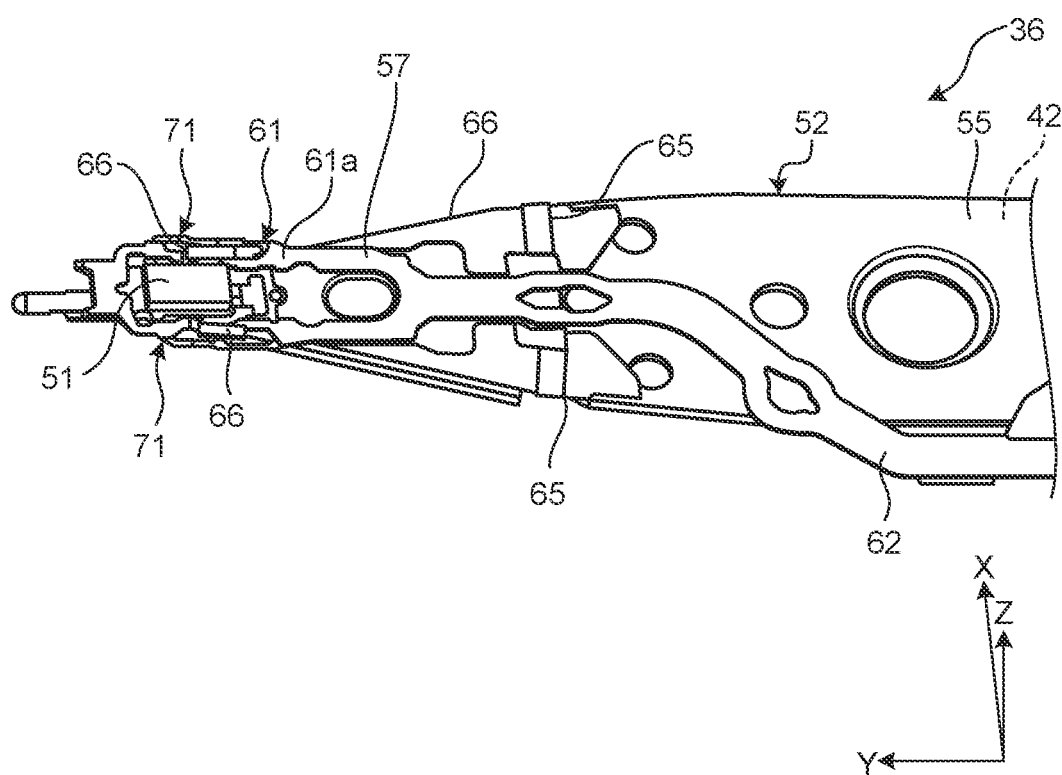
FIG. 2 is an exemplary perspective view partly illustrating an HGA of the first embodiment.

FIG. 2 is an exemplary perspective view partly illustrating the HGA 36 of the first embodiment. As illustrated in FIG. 2, in the present specification, an X axis and a Y axis are further defined for convenience. The X axis, the Y axis, and the Z axis are orthogonal to each other. The Y axis is provided along the arm 42. Furthermore, in the present specification, an X direction and a Y direction are further defined. The X direction is a direction along the X axis and includes a +X direction indicated by an arrow of the X axis and a −X direction which is a direction opposite to the direction indicated by the arrow of the X axis. The Y direction is a direction along the Y axis and includes a +Y direction indicated by an arrow of the Y axis and a −Y direction which is a direction opposite to the direction indicated by the arrow of the Y axis.

The plurality of arms 42 protrude from the actuator block 41 in the +Y direction. Therefore, the Y direction is a longitudinal direction of the arm 42. The X direction is a lateral direction of the arm 42. The X direction and the Y direction change as the carriage 35 rotates.

Each of the plurality of HGAs 36 is attached to a distal end portion of the arm 42 so as to protrude substantially in the +Y direction from the arm 42. As a result, the plurality of HGAs 36 are arranged in the Z direction with a gap interposed therebetween. Each of the plurality of HGAs 36 includes a magnetic head 51 and a suspension 52. The magnetic head 51 may be referred to also as a slider.

The magnetic head 51 records and reproduces information on and from a corresponding one of the plurality of magnetic disks 12. In other words, the magnetic head 51 reads and writes information from and to the magnetic disk 12.

The suspension 52 is attached to the arm 42 and holds the magnetic head 51. The suspension 52 includes a base plate 55, a load beam 56, and a flexure 57.

The base plate 55 and the load beam 56 are made of, for example, stainless steel (SUS). Note that the materials of the base plate 55 and the load beam 56 are not limited to this example. The base plate 55 and the load beam 56 may be made of materials different from each other.

The base plate 55 has a substantially quadrangular shape arranged to be substantially orthogonal to the Z direction. The base plate 55 is attached to the distal end portion of the arm 42 by, for example, caulking.

The load beam 56 has a plate shape thinner than the base plate 55. The load beam 56 is fixed to the base plate 55 by spot welding, for example. The load beam 56 extends from the base plate 55 in approximately the +Y direction.

The flexure 57 is a kind of a flexible printed wiring board of an elongated belt shape. The flexure 57 includes, for example, a gimbal 61 and a suspension tail 62.

The gimbal 61 is disposed at an end of the flexure 57 in the +Y direction. The magnetic head 51 is mounted on the gimbal 61. The gimbal 61 is attached to the load beam 56 such that the part of the gimbal on which the magnetic head 51 is mounted is rotatable.

The suspension tail 62 extends from the gimbal 61 toward the actuator block 41. Another part may be provided between the gimbal 61 and the suspension tail 62.

An end of the suspension tail 62 in the −Y direction is connected to one end of the FPC 37 attached to the actuator block 41 in FIG. 1. The other end of the FPC 37 is connected to, for example, a connector provided on the bottom wall 25.

The carriage 35 rotates about the support shaft 31 to move the magnetic head 51 for the corresponding magnetic disk 12. The VCM 15 moves the magnetic head 51 to a desired position along the magnetic disk 12 by rotating the carriage 35 around the support shaft 31.

The VCM 15 has a voice coil, a pair of yokes, and magnets provided on the yokes. The voice coil is held by the actuator block 41. When the magnetic head 51 moves to an outer edge of the magnetic disk 12 by the rotation of the carriage 35 by the VCM 15, the ramp load mechanism 16 holds the magnetic head 51 apart from the magnetic disk 12.

The PCB 17 is, for example, a rigid board such as a glass epoxy board, and is a multilayer board, a build-up board, or the like. The PCB 17 is arranged outside the housing 11 and attached to the bottom wall 25.

Various electronic components are mounted on the PCB 17, such as a relay connector electrically connected to the FPC 37, an interface (I/F) connector connected to a host computer, and a controller that controls operation of the HDD 10. The relay connector is electrically connected to the FPC 37 via the connector provided on the bottom wall 25. The controller of the PCB 17 drives the VCM 15 to control a position of the magnetic head 51.

As illustrated in FIG. 2, the HGA 36 of the present embodiment includes a pair of first microactuators (MA) 65 and a pair of second microactuators (MA) 66. The second MA 66 is an example of a piezoelectric element.

The first MA 65 and the second MA 66 are piezoelectric elements. The first MA 65 and the second MA 66 are, for example, bulk piezoelectric elements. The first MA 65 and the second MA 66 may be bulk stack type or thin film type piezoelectric elements.

Each of the pair of first MAs 65 is attached to, for example, the connecting part between the base plate 55 and the load beam 56. Note that the first MA 65 is not limited to this example. The paired first MAs 65 are arranged apart from each other in the X direction.

The first MA 65 can expand and contract in the Y direction according to an applied voltage. As the paired first MAs 65 individually expand and contract, for example, the load beam 56 elastically bends in the X direction. As a result, the first MA 65 adjusts the position of the magnetic head 51.

The pair of second MAs 66 is mounted on an outer surface 61a of the gimbal 61, for example. In the present embodiment, the outer surface 61a faces the corresponding magnetic disk 12. The magnetic head 51 is also mounted on the outer surface 61a. Note that the outer surface 61a is not limited to this example.

The paired second MAs 66 are arranged apart from each other in the X direction. The second MA 66 can expand and contract in the Y direction according to an applied voltage. As the paired second MAs 66 individually expand and contract, the gimbal 61 elastically bends in the X direction. As a result, the second MA 66 adjusts the position of the magnetic head 51.

As described above, the HDD 10 according to the present embodiment moves the magnetic head 51 by the VCM 15, the first MA 65, and the second MA 66. In other words, the HDD 10 adjusts the position of the magnetic head 51 by a so-called triple stage actuator (TSA) method.

The gimbal 61 includes two MA attaching parts 71. The two second MAs 66 are mounted on the corresponding MA attaching parts 71 of the flexure 57. The MA attaching part 71 may be provided at another position of the flexure 57.

Figure 3:
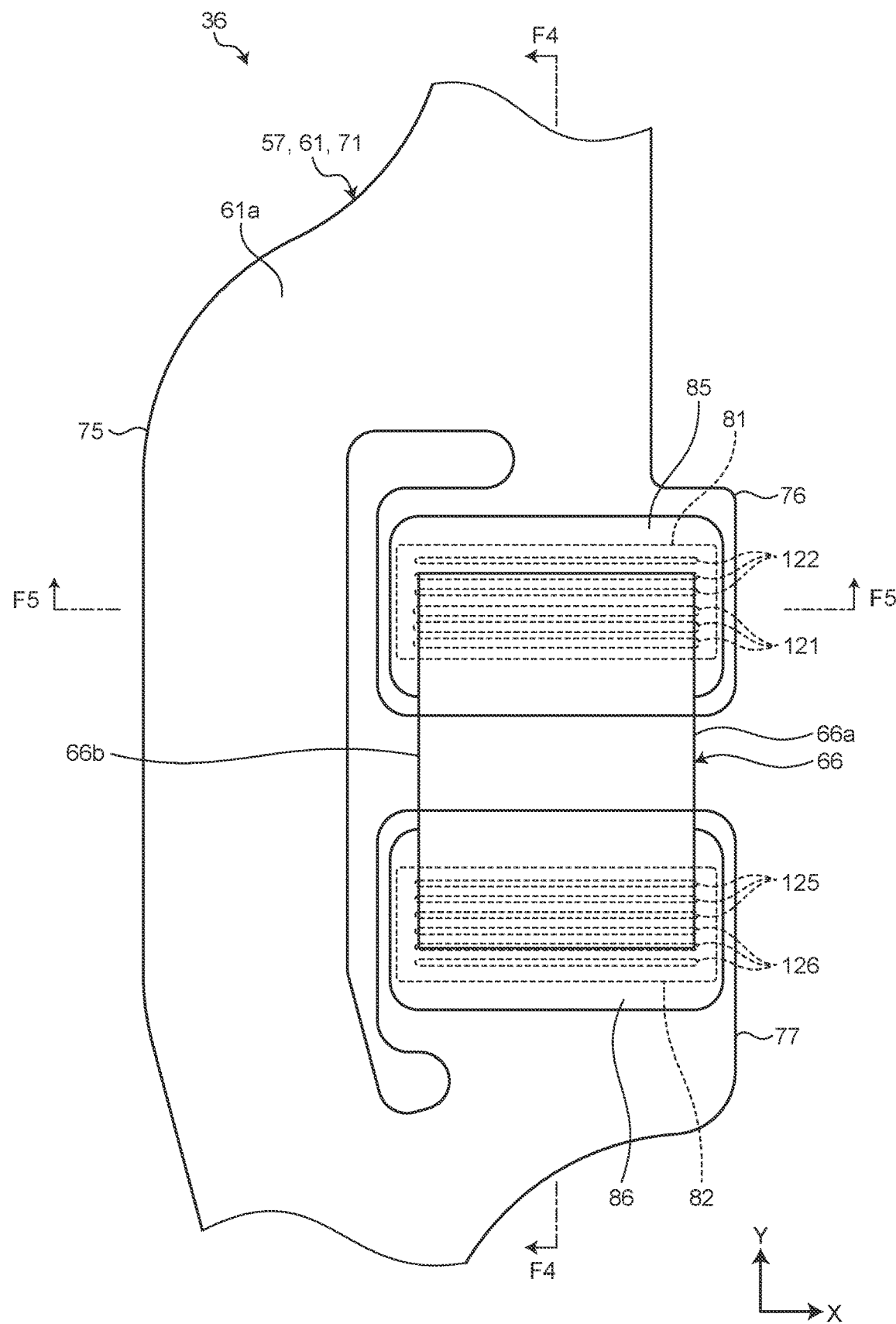
FIG. 3 is an exemplary plan view illustrating a part of the HGA of the first embodiment.

FIG. 3 is an exemplary plan view illustrating a part of the HGA 36 of the first embodiment. As illustrated in FIG. 3, each of the two MA attaching parts 71 includes a peripheral part 75, a first protrusion 76, and a second protrusion 77. The peripheral part 75 is an example of a base.

The peripheral part 75 extends and surrounds the first protrusion 76 and the second protrusion 77. The first protrusion 76 protrudes substantially in the −Y direction from the peripheral part 75. The −Y direction is an example of a first direction. The second protrusion 77 is apart from the first protrusion 76 in the −Y direction and protrudes substantially in the +Y direction from the peripheral part 75. The first protrusion 76 and the second protrusion 77 are spaced apart from each other.

A first pad 81 is disposed on the outer surface 61a of the first protrusion 76. A second pad 82 is disposed on the outer surface 61a of the second protrusion 77. Namely, the second pad 82 is spaced apart from the first pad 81 in the −Y direction.

The +Y directional end of the corresponding second MA 66 is joined to the first pad 81 using a first adhesive 85. The first adhesive 85 is an example of a first bond. The −Y directional end of the corresponding second MA 66 is joined to the second pad 82 using a second adhesive 86. The second adhesive 86 is an example of a second bond.

In the present embodiment, the first adhesive 85 and the second adhesive 86 are conductive adhesives. For example, the first adhesive 85 and the second adhesive 86 are epoxy-based adhesives mixed with a conductive filler such as silver. Viscosities of the first adhesive 85 and the second adhesive 86 are, for example, 8600 to 14600 cP. The first bond and the second bond are not limited to this example, and may be another conductive bond such as solder.

As the second MA 66 expands and contracts in the Y direction, a distance between the first protrusion 76 and the second protrusion 77 changes. For example, when the distance between the first protrusion 76 and the second protrusion 77 in one MA attaching part 71 is reduced and the distance between the first protrusion 76 and the second protrusion 77 in the other MA attaching part 71 is increased, the gimbal 61 is elastically bent.

Figure 4:
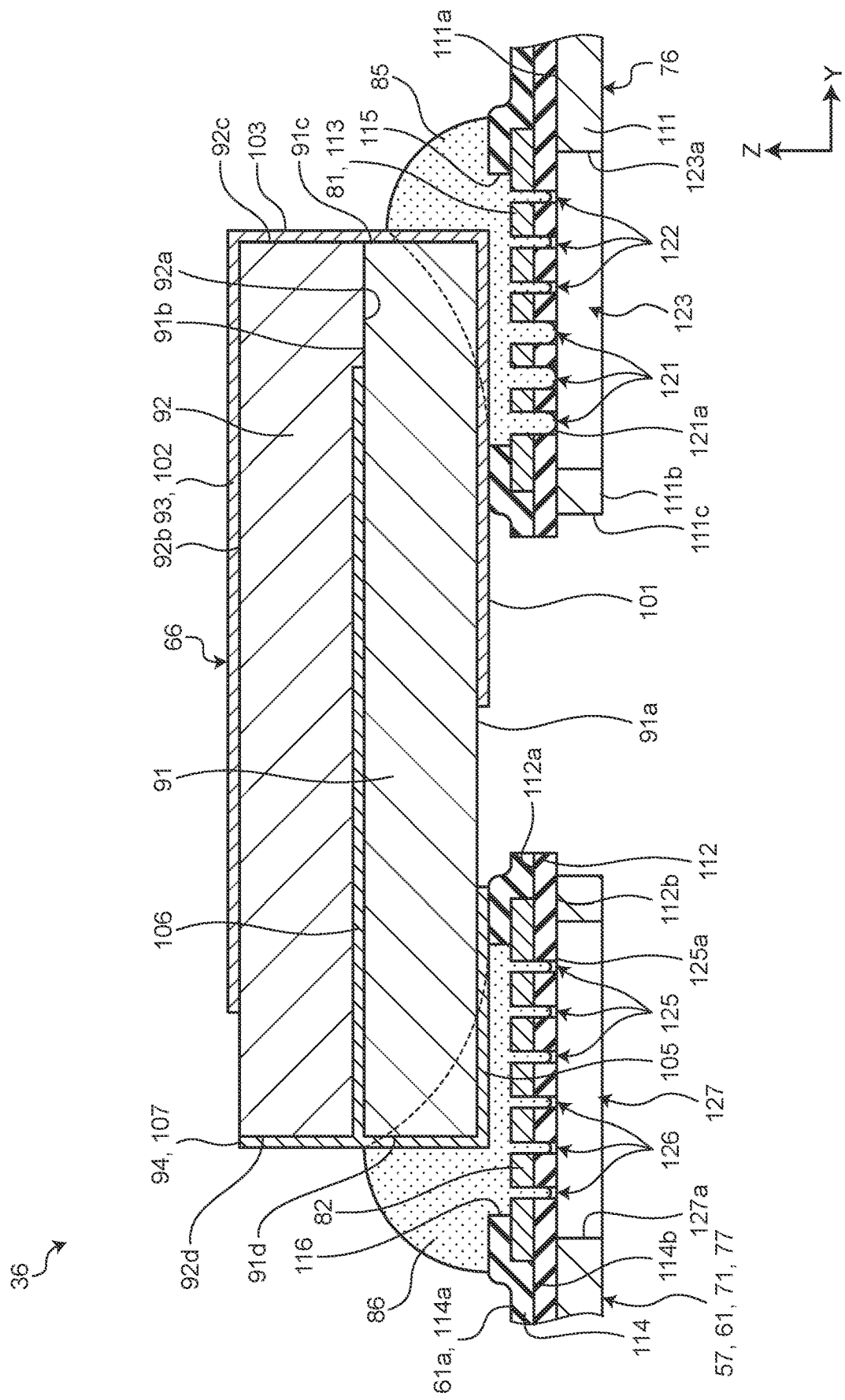
FIG. 4 is an exemplary cross-sectional view illustrating a part of the HGA of the first embodiment taken along line F4-F4 of FIG. 3.
Figure 5:
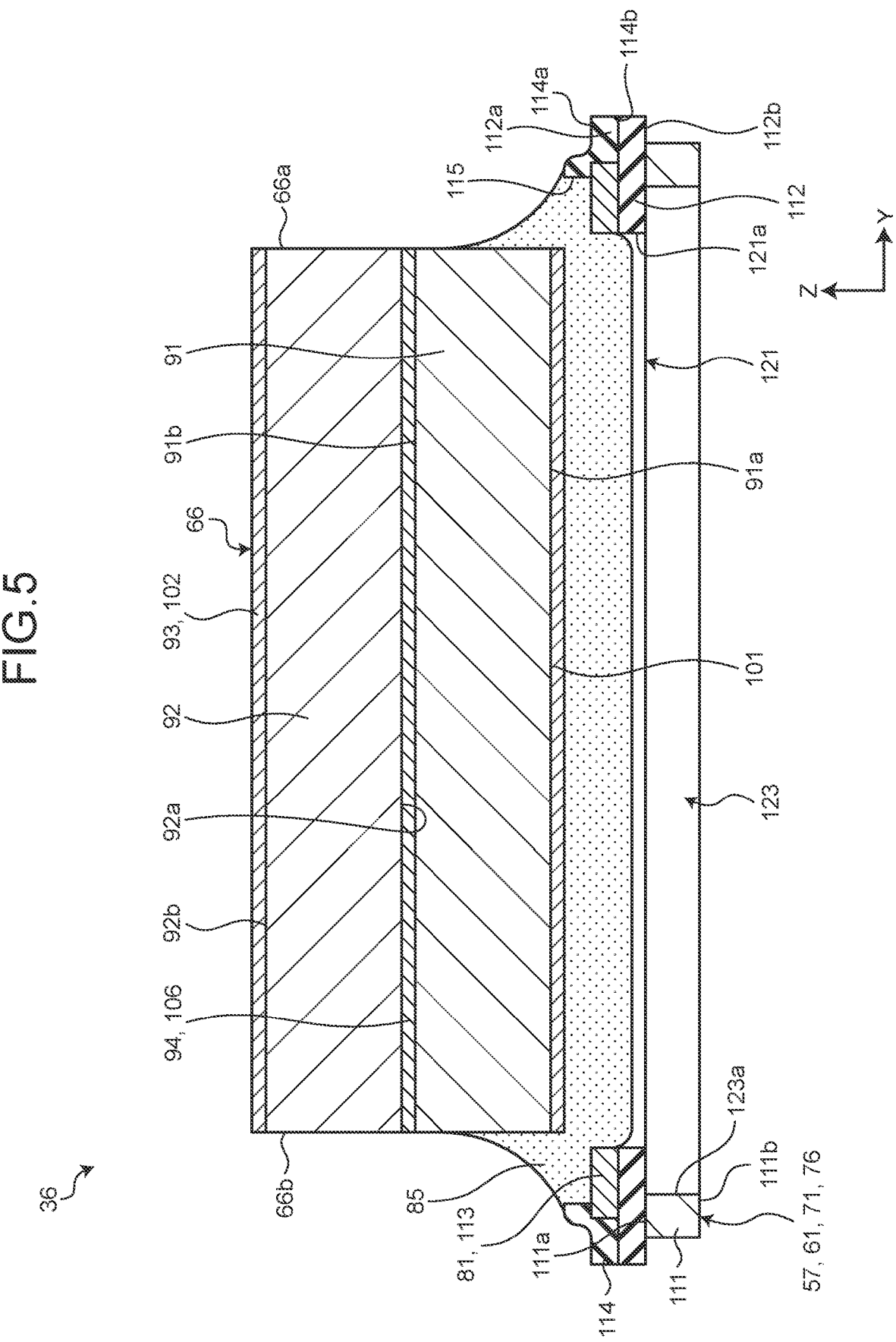
FIG. 5 is an exemplary cross-sectional view illustrating a part of the HGA of the first embodiment taken along line F5-F5 of FIG. 3.

FIG. 4 is an exemplary cross-sectional view illustrating a part of the HGA 36 of the first embodiment taken along line F4-F4 of FIG. 3. FIG. 5 is an exemplary cross-sectional view illustrating a part of the HGA 36 of the first embodiment taken along line F5-F5 of FIG. 3.

As illustrated in FIG. 4, the second MA 66 includes a first piezoelectric body 91, a second piezoelectric body 92, a ground terminal 93, and a signal terminal 94. The first piezoelectric body 91 is an example of a piezoelectric body. The number of piezoelectric bodies included in the second MA 66 is not limited to two.

Each of the first piezoelectric body 91 and the second piezoelectric body 92 has a substantially rectangular parallelepiped shape extending in the Y direction. The first piezoelectric body 91 and the second piezoelectric body 92 have substantially the same shape and are stacked on top of each other in the Z direction.

The first piezoelectric body 91 has a lower surface 91a, an upper surface 91b, and two end surfaces 91c and 91d. The lower surface 91a is an example of a first surface. The upper surface 91b is an example of a second surface. The lower surface 91a, the upper surface 91b, and the end surfaces 91c and 91d are substantially flat. The lower surface 91a faces substantially the −Z direction. The upper surface 91b is opposite to the lower surface 91a and faces substantially the +Z direction. The end surface 91c faces substantially the +Y direction. The end surface 91d is opposite to the end surface 91c and faces substantially the −Y direction.

The lower surface 91a faces the outer surface 61a of the gimbal 61. In the present embodiment, the lower surface 91a faces the first pad 81 on the first protrusion 76 and the second pad 82 on the second protrusion 77.

The second piezoelectric body 92 has a lower surface 92a, an upper surface 92b, and two end surfaces 92c and 92d. The lower surface 92a is an example of a third surface. The upper surface 92b is an example of a fourth surface. The lower surface 92a, the upper surface 92b, and the end surfaces 92c and 92d are substantially flat. The lower surface 92a faces substantially the −Z direction. The lower surface 92a is attached to the upper surface 91b of the first piezoelectric body 91. The upper surface 92b is opposite to the lower surface 92a and faces substantially the +Z direction. The end surface 92c faces substantially the +Y direction. The end surface 92d is opposite to the end surface 92c and faces substantially the −Y direction.

The ground terminal 93 and the signal terminal 94 are made of a conductor such as copper. The ground terminal 93 and the signal terminal 94 are spaced apart from each other and attached to the first piezoelectric body 91 and the second piezoelectric body 92.

The ground terminal 93 includes a lower film 101, an upper film 102, and a side film 103. Note that the ground terminal 93 is not limited to this example. The lower film 101 is an example of a first electrode. The upper film 102 is an example of a fourth electrode.

The lower film 101 is formed on the lower surface 91a of the first piezoelectric body 91. The lower film 101 is spaced apart in the +Y direction from the −Y directional end of the lower surface 91a. The upper film 102 is formed on the upper surface 92b of the second piezoelectric body 92. The upper film 102 is spaced apart in the +Y direction from the −Y directional end of the upper surface 92b. In the Y direction, the upper film 102 extends longer in length than the lower film 101.

The side film 103 is formed on the end surface 91c of the first piezoelectric body 91 and the end surface 92c of the second piezoelectric body 92. The side film 103 connects the lower film 101 and the upper film 102 to each other. Thus, the lower film 101, the upper film 102, and the side film 103 can have the same potential.

The signal terminal 94 includes a lower film 105, an intermediate film 106, and a side film 107. Note that the signal terminal 94 is not limited to this example. The lower film 105 is an example of a second electrode. The intermediate film 106 is an example of a third electrode.

The lower film 105 is formed on the lower surface 91a of the first piezoelectric body 91. The lower film 105 is spaced apart from the lower film 101 of the ground terminal 93 in the −Y direction. The intermediate film 106 is formed on the upper surface 91b of the first piezoelectric body 91. In other words, the intermediate film 106 is interposed between the first piezoelectric body 91 and the second piezoelectric body 92. The intermediate film 106 may be formed on the lower surface 92a of the second piezoelectric body 92. Also in this case, the intermediate film 106 is substantially formed on the upper surface 91b of the first piezoelectric body 91. In the Y direction, the intermediate film 106 extends longer in length than the lower film 105.

The side film 107 is formed on the end surface 91d of the first piezoelectric body 91 and the end surface 92d of the second piezoelectric body 92. The side film 107 connects the lower film 105 and the intermediate film 106 to each other. Therefore, the lower film 105, the intermediate film 106, and the side film 107 can have the same potential.

The upper film 102 of the ground terminal 93 overlaps the intermediate film 106 of the signal terminal 94 in the −Z direction. Therefore, the second piezoelectric body 92 is interposed between the upper film 102 and the intermediate film 106. The −Z direction is a direction to which the lower surface 91a faces, and is an example of a second direction. The intermediate film 106 of the signal terminal 94 overlaps the lower film 101 of the ground terminal 93 in the −Z direction. Therefore, the first piezoelectric body 91 is interposed between the intermediate film 106 and the lower film 101.

As illustrated in FIG. 5, the second MA 66 has two side surfaces 66a and 66b. The side surface 66a is an example of an end surface. The side surface 66a is located at an end of the second MA 66 in the +X direction. The +X direction is a direction along the lower surface 91a and orthogonal to the −Y direction, and is an example of a third direction. The side surface 66a is substantially flat and faces substantially the +X direction. The side surface 66b is opposite to the side surface 66a. The side surface 66b is located at an end of the second MA 66 in the −X direction. The side surface 66b is substantially flat and faces substantially the −X direction.

The ground terminal 93 and the signal terminal 94 extend from one side surface 66a to the other side surface 66b of the second MA 66. Because of this, the lower film 101, the upper film 102, and the side film 103 of the ground terminal 93, and the lower film 105, the intermediate film 106, and the side film 107 of the signal terminal 94 are exposed to the outside of the second MA 66 on the side surface 66a, 66b. Note that the exposed parts of the ground terminal 93 and the signal terminal 94 on the side surfaces 66a and 66b may be covered with elements such as the first adhesive 85 and the second adhesive 86 not included in the second MA 66.

As illustrated in FIG. 4, the outer surface 61a of the first protrusion 76 faces the lower film 101 of the ground terminal 93. In the present embodiment, the first protrusion 76 is spaced apart from the signal terminal 94. The first adhesive 85 joins the first pad 81 mounted on the first protrusion 76 and the lower film 101 and the side film 103 of the ground terminal 93 together. In other words, the first adhesive 85 physically and electrically connects the first pad 81 and the ground terminal 93.

The outer surface 61a of the second protrusion 77 faces the lower film 105 of the signal terminal 94. In the present embodiment, the second protrusion 77 is spaced apart from the ground terminal 93. The second adhesive 86 joins the second pad 82 mounted on the second protrusion 77 and the lower film 105 and the side film 107 of the signal terminal 94 together. In other words, the second adhesive 86 physically and electrically connects the second pad 82 and the signal terminal 94.

As illustrated in FIG. 5, the first adhesive 85 and the second adhesive 86 may be further attached to the side surfaces 66a and 66b of the second MA 66. The first adhesive 85 is spaced apart from the second pad 82, the second adhesive 86, and the signal terminal 94. The second adhesive 86 is spaced apart from the first pad 81, the first adhesive 85, and the ground terminal 93.

As illustrated in FIG. 4, the flexure 57 includes a backing layer 111, a base layer 112, a conductive layer 113, and a cover layer 114. The backing layer 111 is an example of a metal plate. The base layer 112 is an example of a second insulating layer. The cover layer 114 is an example of a first insulating layer.

The backing layer 111, the base layer 112, the conductive layer 113, and the cover layer 114 are stacked on top of one another in the Z direction in most of the flexure 57. Thus, each of the first protrusion 76 and the second protrusion 77 includes the backing layer 111, the base layer 112, the conductive layer 113, and the cover layer 114 in part. Note that the flexure 57 may include, for example, a part including no backing layer 111 and a part including no base layer 112, conductive layer 113, and cover layer 114.

The backing layer 111 is, for example, a metal plate made of metal such as stainless steel. The backing layer 111 has two surfaces 111a and 111b. The surface 111a is substantially flat and faces the +Z direction. The surface 111b is opposite to the surface 111a. The surface 111b is substantially flat and faces the −Z direction. The surface 111b is exposed to the outside and forms a surface of the flexure 57, the surface opposite to the outer surface 61a.

The base layer 112 and the cover layer 114 are made of an insulator such as polyimide (PI). The base layer 112 and the cover layer 114 are made of the same material. Note that the base layer 112 and the cover layer 114 may be made of mutually different materials.

The base layer 112 covers the surface 111a of the backing layer 111 and is fixed to the surface 111a. The base layer 112 may be bonded to the surface 111a by, for example, an adhesive layer, or may be directly attached to the surface 111a.

The base layer 112 has two surfaces 112a and 112b. The surface 112a is substantially flat and faces the +Z direction. The surface 112b is opposite to the surface 112a. The surface 112b is substantially flat and faces the −Z direction. The surface 112b is fixed to the surface 111a of the backing layer 111.

The conductive layer 113 is disposed on the surface 112a of the base layer 112. The conductive layer 113 is made of a conductor such as copper. The conductive layer 113 is thinner than the backing layer 111. The thickness of the conductive layer 113 is, for example, 14 to 20 µm. The thicknesses of the backing layer 111 and the conductive layer 113 are not limited to this example.

The conductive layer 113 includes, for example, a plurality of wiring patterns and pads. As an example, the conductive layer 113 includes the first pad 81 and the second pad 82. The conductive layer 113 further includes a pad connected to the magnetic head 51, a pad connected to the FPC 37, and a wiring pattern that connects the plurality of pads to each other. Note that the conductive layer 113 is not limited to this example.

The cover layer 114 covers at least a part of the surface 112a of the base layer 112 and the conductive layer 113, and is fixed to the base layer 112 and the conductive layer 113. In other words, the cover layer 114 covers at least a part of the conductive layer 113 and covers the base layer 112 at a position where the conductive layer 113 is not provided. The cover layer 114 may be bonded to the surface 112a by, for example, an adhesive layer, or may be directly attached to the surface 112a.

In the flexure 57, the base layer 112 is interposed between the backing layer 111 and the cover layer 114. Furthermore, the conductive layer 113 is interposed between the base layer 112 and the cover layer 114. The flexure 57 may be a multilayer substrate including a plurality of insulating layers and a plurality of conductive layers instead of the base layer 112.

The cover layer 114 has two surfaces 114a and 114b. The surface 114a is exposed to the outside and forms a part of the outer surface 61a of the flexure 57. The surface 114b is opposite to the surface 114a. The surface 114b is fixed to the surface 112a of the base layer 112 and the conductive layer 113.

The cover layer 114 is provided with a first exposure hole 115 and a second exposure hole 116. Each of the first exposure hole 115 and the second exposure hole 116 penetrates the cover layer 114 in a substantially Z direction and opens to the surfaces 114a and 114b.

The first exposure hole 115 is provided in the first protrusion 76 and exposes at least a part of the first pad 81 to the outside of the flexure 57. A surface of the first pad 81 exposed by the first exposure hole 115 forms a part of the outer surface 61a of the flexure 57.

The second exposure hole 116 is included in the second protrusion 77, exposing at least a part of the second pad 82 to the outside of the flexure 57. A surface of the second pad 82 exposed by the second exposure hole 116 forms a part of the outer surface 61a of the flexure 57. In other words, the outer surface 61a includes the surface 114a of the cover layer 114, the surface of the first pad 81 exposed by the first exposure hole 115, and the surface of the second pad 82 exposed by the second exposure hole 116.

The first protrusion 76 is provided with a plurality of through holes 121 and 122. The plurality of through holes 121 are examples of a first through hole and a through hole. The plurality of through holes 122 are examples of first holes. In the substantially Z direction, each of the plurality of through holes 121 and 122 opens to the first pad 81 through the flexure 57 in the first protrusion 76. In the present embodiment, the through holes 121, 122 penetrate the base layer 112 and the first pad 81 of the conductive layer 113.

The plurality of through holes 121 extend in a part of the first pad 81 with which the lower film 101 and the intermediate film 106 overlap in the −Z direction. In addition, the plurality of through holes 121 of the present embodiment extend between the end and center of the first pad 81 in the −Y direction.

The plurality of through holes 122 are arranged at positions spaced apart from the intermediate film 106 in the +Y direction along the outer surface 61a. In other words, the intermediate film 106 does not overlap the through hole 122 in the −Z direction. The +Y direction is an example of a fourth direction.

Each of the plurality of through holes 121 and 122 has, for example, a substantially oval shape extending in a substantially X direction. The plurality of through holes 121 and 122 are arranged at intervals in a substantially Y direction. Note that the shape of the plurality of through holes 121 and 122 may be another shape such as a circle, a quadrangle, or a rectangle.

The through hole 121 is larger in cross-sectional area than the through hole 122. The cross-sectional areas of the through holes 121, 122 are cross-sectional areas orthogonal to a direction (Z direction) in which the through holes 121, 122 extend.

In the present embodiment, the cross-sectional area of each of the plurality of through holes 121 is larger than the cross-sectional area of each of the plurality of through holes 122. Furthermore, a total cross-sectional area of the plurality of through holes 121 is larger than a total cross-sectional area of the plurality of through holes 122. The cross-sectional areas of the through holes 121, 122 is not limited to this example. The cross-sectional area of the through hole 121 may be the same as or smaller than the cross-sectional area of the through hole 122.

In the first protrusion 76, the backing layer 111 is provided with a through hole 123. The through hole 123 is an example of a third through hole. The through hole 123 penetrates the backing layer 111 to be in communication with the plurality of through holes 121 and 122.

An edge 123a of the through hole 123 surrounds the plurality of through holes 121 with spacing from an edge 121a of each of the through holes 121. The edge 123a of the through hole 123 is spaced apart from an edge 111c of the backing layer 111. In other words, the through hole 123 is formed (defined, sectioned) by the endless edge 123a.

The second protrusion 77 is provided with a plurality of through holes 125 and 126. The plurality of through holes 125 are examples of second through holes. The plurality of through holes 126 are examples of second holes. In the second protrusion 77, each of the plurality of through holes 125 and 126 opens to the second pad 82 through the flexure 57 in the substantially Z direction. In the present embodiment, the through holes 125 and 126 penetrate the base layer 112 and the second pad 82 of the conductive layer 113.

The plurality of through holes 125 extend in a part of the second pad 82 with which the lower film 105 and the upper film 102 overlap in the −Z direction. In addition, the plurality of through holes 125 of the present embodiment extend between the end and center of the second pad 82 in the +Y direction. The plurality of through holes 126 are located apart from the upper film 102 in the −Y direction along the outer surface 61a.

Each of the plurality of through holes 125 and 126 has, for example, a substantially oval shape extending in the substantially X direction. The plurality of through holes 125 and 126 are arranged at intervals in the substantially Y direction. Note that the shape of the plurality of through holes 125 and 126 may be another shape such as a circle, a quadrangle, or a rectangle.

The through holes 125, 126 are smaller in cross-sectional area than the through hole 121. In the present embodiment, each of the plurality of through holes 125 and 126 has a smaller cross-sectional area than each of the plurality of through holes 121. Furthermore, a total cross-sectional area of the plurality of through holes 125 is smaller than a total cross-sectional area of the plurality of through holes 121. The cross-sectional area of the through hole 125, 126 is not limited to this example. The through holes 125, 126 may be the same as or larger than the through hole 121 in cross-sectional area.

In the second protrusion 77, the backing layer 111 is provided with a through hole 127. The through hole 127 penetrates the backing layer 111 and communicates with the plurality of through holes 125 and 126. An edge 127a of the through hole 127 is spaced apart from an edge 125a of each of the plurality of through holes 125 and surrounds the plurality of through holes 125. The edge 127a of the through hole 127 is spaced apart from the edge 111c of the backing layer 111.

The first adhesive 85 is partly accommodated in the through holes 121, 122. Note that the first adhesive 85 may enter the through hole 121 only slightly. A part of the first adhesive 85 is attached to a part of the flexure 57 where the backing layer 111 overlaps in the +Z direction. In other words, a part of the first adhesive 85 is attached to a higher-rigidity part of the flexure 57 including the backing layer 111. The +Z direction is a direction to which the outer surface 61a faces, and is an example of a sixth direction.

The second adhesive 86 is partly accommodated in the through hole 125, 126. Note that the second adhesive 86 may enter the through hole 125 only slightly. A part of the second adhesive 86 is attached to the flexure 57 at a position where the backing layer 111 overlaps in the +Z direction.

In the present embodiment, the first adhesive 85 remains in the through holes 121, 122 away from the through hole 123. In addition, the second adhesive 86 remains in the through hole 125, 126 away from the through hole 127. The first adhesive 85 and the second adhesive 86 may be partly accommodated in the through holes 123 and 127, respectively.

The first pad 81 is set to a ground potential. For example, the first pad 81 is electrically connected to a ground plane. Thus, the ground terminal 93 is also set to the ground potential.

The second pad 82 is electrically connected to the controller of the PCB 17 via the flexure 57 and the FPC 37. The controller applies an electrical signal to the second pad 82 to adjust the position of the magnetic head 51.

By applying the electrical signal to the second pad 82, a potential difference occurs between the signal terminal 94 and the ground terminal 93. The potential difference causes the first piezoelectric body 91 and the second piezoelectric body 92 to deform, whereby that the second MA 66 expands and contracts in the Y direction. In other words, the second MA 66 expands or contracts in the Y direction (the +Y direction and the −Y direction) by an applied voltage to the lower film 105.

In the following, description will be made of an example of a method of mounting the second MA 66 on the flexure 57 as a part of a method of manufacturing the HDD 10. The method of mounting the second MA 66 is not limited to the following method, and other methods may be used.

First, the first adhesive 85 is applied to the first pad 81, and the second adhesive 86 is applied to the second pad 82. At this time, the first adhesive 85 and the second adhesive 86 are not cured and have fluidity. The first adhesive 85 may be applied to the lower film 101 of the ground terminal 93. The second adhesive 86 may be applied to the lower film 105 of the signal terminal 94.

Next, the second MA 66 is placed on the flexure 57 by, for example, a mounter. The mounter brings the second MA 66 close to the flexure 57 until a distance between the second MA 66 and the flexure 57 reaches a predetermined value.

As the second MA 66 approaches the flexure 57, the first adhesive 85 is crushed between the first pad 81 and the lower film 101 of the ground terminal 93. The first adhesive 85 spreads along the second MA 66 and the outer surface 61a of the flexure 57. Accordingly, the first adhesive 85 is attached to the side film 103 of the ground terminal 93. In addition, the first adhesive 85 may be attached to the side surfaces 66a and 66b of the second MA 66.

A part of the first adhesive 85 flows into the plurality of through holes 121 and 122. In other words, the part of the first adhesive 85 is pushed into the through holes 121, 122 by the second MA 66. Since there exists resistance in the plurality of through holes 121 and 122, an amount of the first adhesive 85 flowing into the through holes 121 and 122 is smaller than an amount spreading along the second MA 66 and the flexure 57. Note that a flow of the first adhesive 85 is not limited to this example.

The through holes 121, 122 accommodate the part of the first adhesive 85 to reduce the amount of the first adhesive 85 spreading along the second MA 66 and the flexure 57. Therefore, the through holes 121 and 122 prevent the first adhesive 85 moving along the side surfaces 66a and 66b of the second MA 66 from reaching the intermediate film 106 of the signal terminal 94 exposed on the side surfaces 66a and 66b.

Similarly, as the second MA 66 approaches the flexure 57, the second adhesive 86 is crushed between the second pad 82 and the lower film 105 of the signal terminal 94. The second adhesive 86 spreads along the second MA 66 and the outer surface 61a of the flexure 57. Accordingly, the second adhesive 86 is attached to the side film 107 of the signal terminal 94. In addition, the second adhesive 86 may be attached to the side surfaces 66a and 66b of the second MA 66.

A part of the second adhesive 86 flows into the plurality of through holes 125 and 126. The second adhesive 86 faces resistance in the plurality of through holes 125 and 126, so that a less amount of the second adhesive 86 flows into the through holes 125 and 126 than an amount thereof spreading along the second MA 66 and the flexure 57. Note that a flow of the second adhesive 86 is not limited to this example.

The through hole 125, 126 accommodates the part of the second adhesive 86 to reduce the amount of the second adhesive 86 spreading along the second MA 66 and the flexure 57. Therefore, the through holes 125 and 126 prevent the second adhesive 86 moving along the side surfaces 66a and 66b of the second MA 66 from reaching the upper film 102 of the ground terminal 93 exposed on the side surfaces 66a and 66b.

Next, the first adhesive 85 and the second adhesive 86 are cured. Furthermore, the flexure 57 is cleaned with, for example, a cleaning liquid, and fine particles generated from, for example, the first adhesive 85 and the second adhesive 86 are removed. As a result, mounting of the second MA 66 on the flexure 57 is completed.

The through holes 121, 122, 123, 125, 126, 127 can be formed by various methods. For example, the through holes 121, 122, 123, 125, 126, 127 is formed by processing the backing layer 111, the base layer 112, and the conductive layer 113 by etching when the flexure 57 is manufactured.

In the HDD 10 according to the first embodiment described above, the second MA 66 includes the first piezoelectric body 91, the lower film 101, the lower film 105, and the intermediate film 106. The lower film 101 is formed on the lower surface 91a of the first piezoelectric body 91. The lower film 105 is formed on the lower surface 91a away from the lower film 101 in the −Y direction along the lower surface 91a. The intermediate film 106 is formed on the upper surface 91b of the first piezoelectric body 91, the upper surface 91b opposite to the lower surface 91a. The intermediate film 106 is connected to the lower film 105. The flexure 57 includes the outer surface 61a, the first pad 81, and the second pad 82. The outer surface 61a faces the lower film 101 and the lower film 105. The first pad 81 is disposed on the outer surface 61a. The second pad 82 is disposed on the outer surface 61a away from the first pad 81 in the −Y direction. The flexure 57 is provided with the through hole 121. The through hole 121 opens to a part of the first pad 81, the part with which the lower film 101 and the intermediate film 106 overlap in the −Z direction which the lower surface 91a faces. In other words, the through hole 121 opens to the first pad 81 between the end and center of the first pad 81 in the −Y direction. The conductive, first adhesive 85 joins the first pad 81 and the lower film 101 together and is partly accommodated in the through hole 121.

The intermediate film 106 is connected to the lower film 105. Thus, the intermediate film 106 is generally spaced apart in the −Y direction from the +Y directional end of the upper surface 91b. For example, the first adhesive 85 is applied in advance to the first pad 81 or the lower film 101. When joining the second MA 66 to the first pad 81 with the first adhesive 85, the first adhesive 85 is pressed between the first pad 81 and the lower film 101 and partly flows into the through hole 121. This can prevent or restrict the first adhesive 85 from spreading to the intermediate film 106 along the second MA 66. As such, the HDD 10 according to the present embodiment can reduce the possibility that the lower film 101 and the intermediate film 106 are short-circuited due to the first adhesive 85, leading to avoiding deterioration in electrical properties of the second MA 66 due to the short-circuit. The HDD 10 can easily allow prevention of the short-circuiting during manufacturing, making it easier to manufacture the HDD 10 with an improved yield. In addition, the first adhesive 85 is partly accommodated in the through hole 121, and joins the first pad 81 and the lower film 101 together. In other words, the through hole 121 works to increase the contact area between the flexure 57 and the first adhesive 85. This makes it possible to more firmly attach the second MA 66 to the flexure 57 using the first adhesive 85, as compared with the first adhesive 85 simply attached to the surface of the first pad 81. In this manner the HDD 10 of the present embodiment can avoid a decrease in strength of the suspension 52 including the second MA 66 and the flexure 57 irrespective of the through hole 121 in the flexure 57.

The second MA 66 has the side surface 66a. The side surface 66a is located at the end of the second MA 66 in the +X direction along the lower surface 91a and orthogonal to the −Y direction. The intermediate film 106 is exposed to the outside of the second MA 66 at least on the side surface 66a. The first adhesive 85 may spread to the exposed intermediate film 106 along the side surface 66a, which may cause a short circuit between the lower film 101 and the intermediate film 106. However, the HDD 10 of the present embodiment allows the first adhesive 85 to partly flow into the through hole 121, which makes it possible to reduce the possibility that the lower film 101 and the intermediate film 106 are short-circuited due to the first adhesive 85.

The flexure 57 is provided with the through hole 122. The through hole 122 opens to the first pad 81 apart from the intermediate film 106 in the +Y direction opposite to the −Y direction along the outer surface 61a. At the time of joining the second MA 66 to the first pad 81 using the first adhesive 85, the first adhesive 85 can be avoided or restricted from spreading to the intermediate film 106 along the second MA 66, by partly flowing into the through hole 122. As such, the HDD 10 of the present embodiment can ensure that the lower film 101 and the intermediate film 106 can be avoided from short-circuiting due to the first adhesive 85.

The through hole 122 penetrates the flexure 57. As a result, the first adhesive 85 easily flows into the through hole 122. This makes it possible to prevent or restrict the first adhesive 85 from spreading to the intermediate film 106 along the second MA 66.

The through hole 121 is larger in cross-sectional area than the through hole 122. This allows a decrease in the flow amount of the first adhesive 85 into the through hole 122 at the location apart from the intermediate film 106. For example, a larger amount of the first adhesive 85 can spread at the locations away from the intermediate film 106 and be attached to the side film 103. In this manner, the HDD 10 of the present embodiment can avoid or reduce a decrease in the contact area between the second MA 66 and the first adhesive 85, thereby preventing a decrease in the strength of the suspension 52 including the second MA 66 and the flexure 57.

The second MA 66 includes the second piezoelectric body 92 and the upper film 102. The lower surface 92a of the second piezoelectric body 92 is attached to the upper surface 91b. The upper film 102 is formed on the upper surface 92b of the second piezoelectric body 92, the upper surface 92b opposite to the lower surface 92a. The upper film 102 is connected to the lower film 101. The flexure 57 is provided with the through hole 125. The through hole 125 opens to a part of the second pad 82, the part with which the lower film 105 and the upper film 102 overlap in the −Z direction. The second adhesive 86 is partly accommodated in the through hole 125. In joining the second MA 66 to the second pad 82 using the second adhesive 86, the second adhesive 86 is pressed between the second pad 82 and the lower film 105 and partly flows into the through hole 125. Thereby, the second adhesive 86 can be prevented or restricted from spreading to the upper film 102 along the second MA 66. Consequently, the HDD 10 of the present embodiment can prevent the lower film 105 and the upper film 102 from being short-circuited due to the second adhesive 86. In addition, the HDD 10 of the present embodiment can avoid or reduce a decrease in the strength of the suspension 52 including the second MA 66 and the flexure 57 irrespective of the through hole 125 in the flexure 57.

The flexure 57 is provided with the through hole 126. The through hole 126 opens to a part of the second pad 82, the part being apart from the upper film 102 in the −Y direction along the outer surface 61a. When joining the second MA 66 to the second pad 82 using the second adhesive 86, the second adhesive 86 can be prevented or restricted from spreading to the upper film 102 along the second MA 66, by partly flowing into the through hole 126. In this manner, the HDD 10 of the present embodiment can ensure that the lower film 105 and the upper film 102 can be avoided from being short-circuited due to the second adhesive 86.

The through hole 125 is smaller in cross-sectional area than the through hole 121. This can decrease the flow amount of the second adhesive 86 into the through hole 125. The HDD 10 of the present embodiment can thus prevent or reduce a decrease in the contact area between the second MA 66 and the second adhesive 86, avoiding a decrease in the strength of the suspension 52 including the second MA 66 and the flexure 57. Due to the upper film 102 formed on the upper surface 92b of the second piezoelectric body 92, the lower film 105 and the upper film 102 are in a longer distance than the lower film 101 and the intermediate film 106. As such, the HDD 10 of the present embodiment can reduce the possibility that the lower film 105 and the upper film 102 are short-circuited due to the second adhesive 86 irrespective of a less flow amount of the second adhesive 86 into the through hole 125.

The flexure 57 includes the backing layer 111, the cover layer 114, the base layer 112, and the conductive layer 113. The base layer 112 is interposed between the backing layer 111 and the cover layer 114. The conductive layer 113 is interposed between the cover layer 114 and the base layer 112. The conductive layer 113 includes the first pad 81. The through hole 121 penetrates the base layer 112 and the first pad 81. The backing layer 111 is provided with the through hole 123 communicating with the through hole 121. The edge 123a of the through hole 123 surrounds the through hole 121 with spacing from the edge 121a of the through hole 121. Such an arrangement can prevent or restrict the first adhesive 85 having passed through the through hole 121 from contacting the backing layer 111. In other words, the HDD 10 of the present embodiment can reduce the possibility that the lower film 101 and the backing layer 111 are short-circuited due to the first adhesive 85.

A part of the first adhesive 85 is attached to a part of the flexure 57, the part including the backing layer 111 in the +Z direction which the outer surface 61a faces. In other words, the first adhesive 85 joins the second MA 66 to the higher-rigidity part of the flexure 57 by the backing layer 111. Such joining causes the force generated by the second MA 66 to be more efficiently transmitted to the flexure 57. Consequently, the HDD 10 of the present embodiment can allow the second MA 66 to stably deform the flexure 57, leading to implementing stable adjustment of the position of the magnetic head 51.

The first pad 81 is set to a ground potential. The second MA 66 is configured to expand or contract in the +Y direction by an applied voltage to the lower film 105. As a result, in a situation that the first adhesive 85 is attached to, for example, the backing layer 111 through the through hole 121, the first adhesive 85 can be avoided or restricted from having an influence on the operation of the first piezoelectric body 91 and the second piezoelectric body 92.

Second Embodiment

In the following, a second embodiment will be described with reference to FIG. 6. In the following description of a plurality of embodiments, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 6:
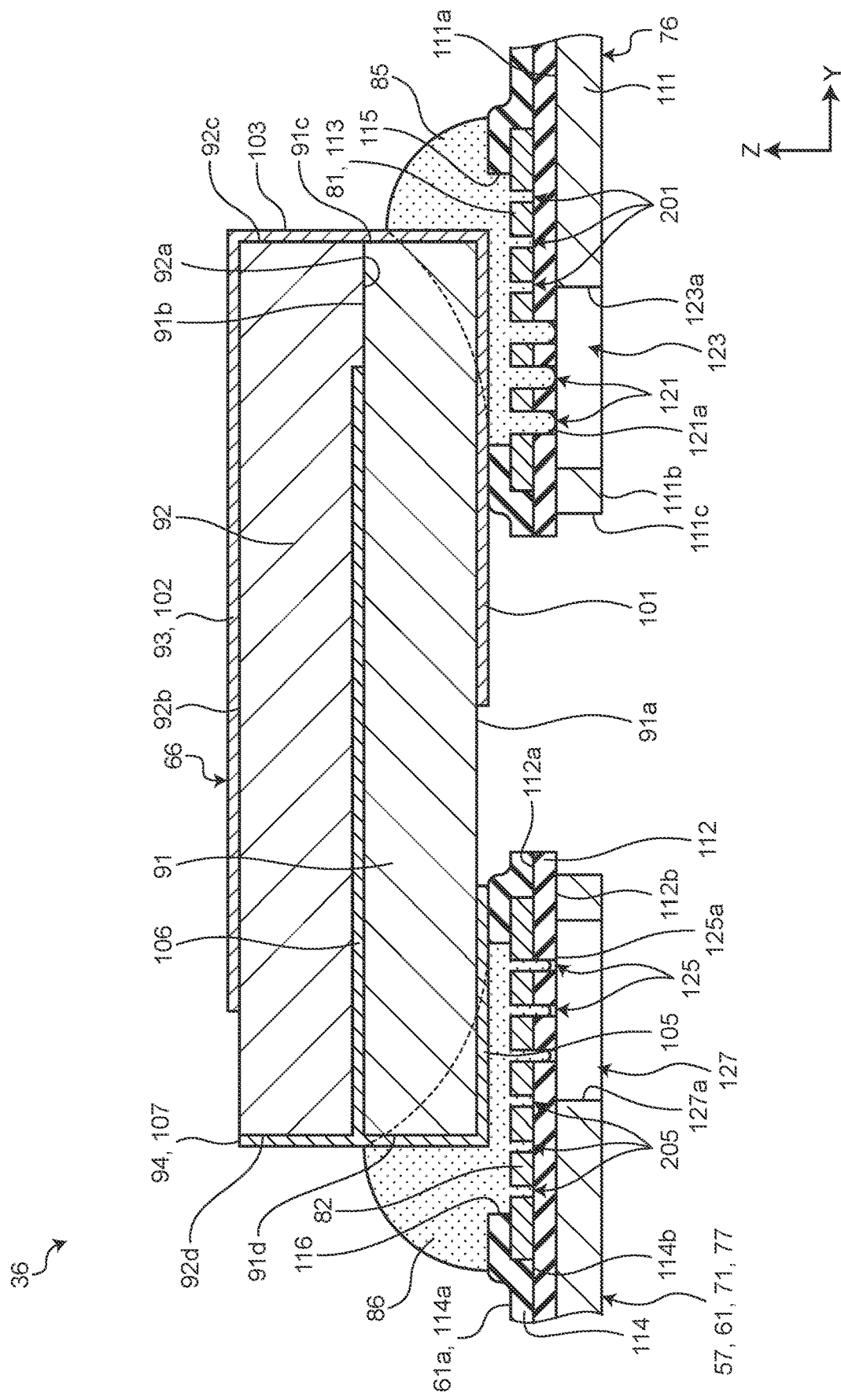
FIG. 6 is an exemplary cross-sectional view illustrating a part of an HGA according to a second embodiment.

FIG. 6 is an exemplary cross-sectional view illustrating a part of an HGA 36 according to a second embodiment; As illustrated in FIG. 6, a first protrusion 76 of the second embodiment is provided with a plurality of holes 201 instead of the plurality of through holes 122. The hole 201 is an example of a first hole. The hole 201 is substantially the same as the through hole 122 except points as will be described below.

Furthermore, a second protrusion 77 of the second embodiment is provided with a plurality of holes 205 instead of the plurality of through holes 126. The hole 205 is an example of a second hole. The hole 205 is substantially the same the through hole 126 except points as will be described below.

The plurality of holes 201 pass through a first pad 81 of a conductive layer 113. The plurality of holes 205 pass through a second pad 82 of the conductive layer 113. However, the holes 201, 205 do not penetrate a base layer 112. The base layer 112 closes the plurality of holes 201 and 205. That is, the holes 201 are recesses open to the first pad 81 while the holes 205 are recesses open to the second pad 82.

In an HDD 10 of the second embodiment described above, the holes 201 penetrate the first pad 81, and the base layer 112 closes the holes 201. In other words, the holes 201 are shallower in depth than the through holes 121. This makes it possible to decrease the flow amount of a first adhesive 85 into the through holes 201 at the locations apart from an intermediate film 106. As such, the HDD 10 of the present embodiment can prevent a decrease in the contact area between the second MA 66 and the first adhesive 85, leading to avoiding or reducing a decrease in the strength of the suspension 52 including the second MA 66 and the flexure 57.

Third Embodiment

Figure 7:
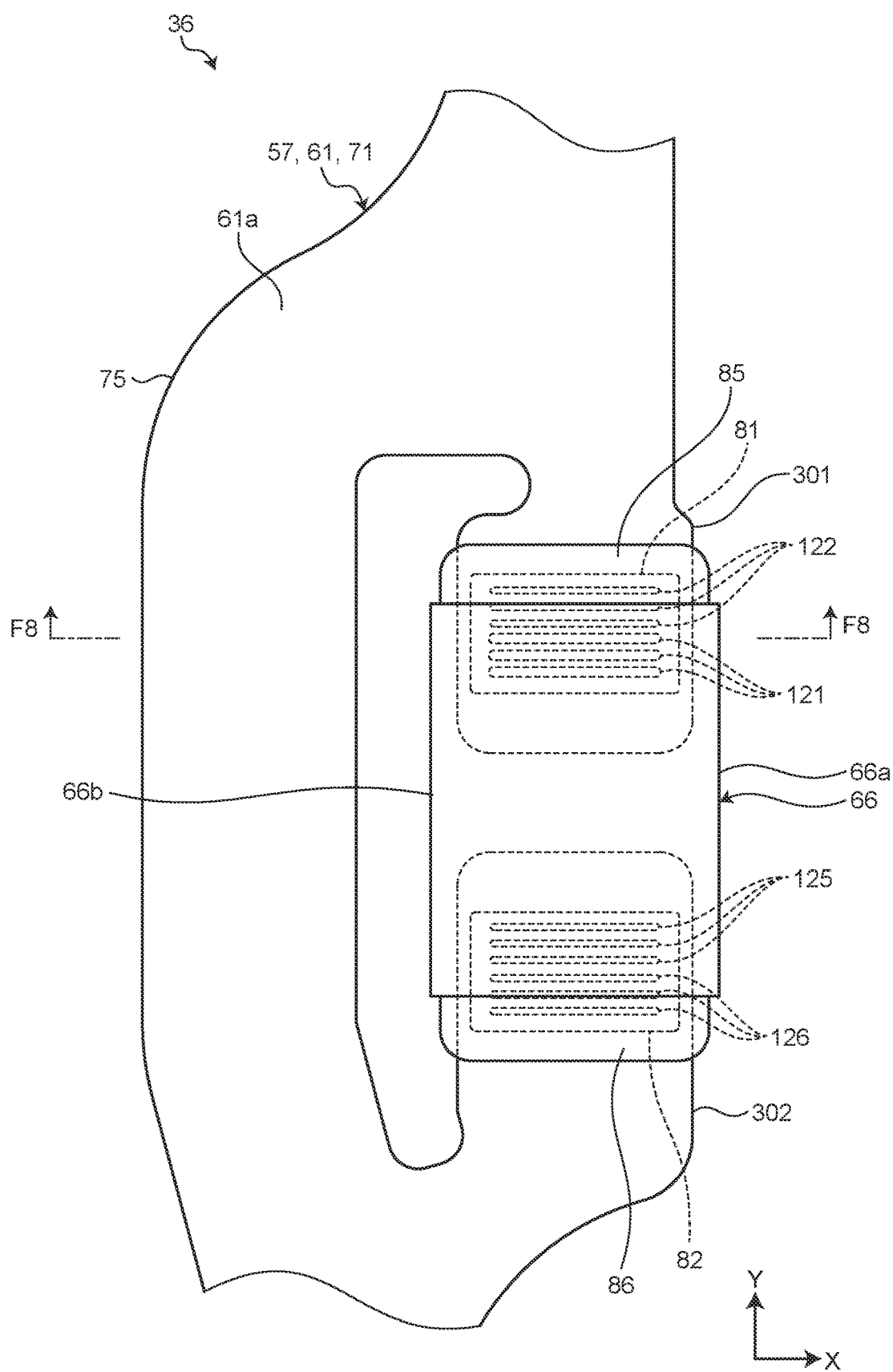
FIG. 7 is an exemplary plan view illustrating a part of an HGA according to a third embodiment.
Figure 8:
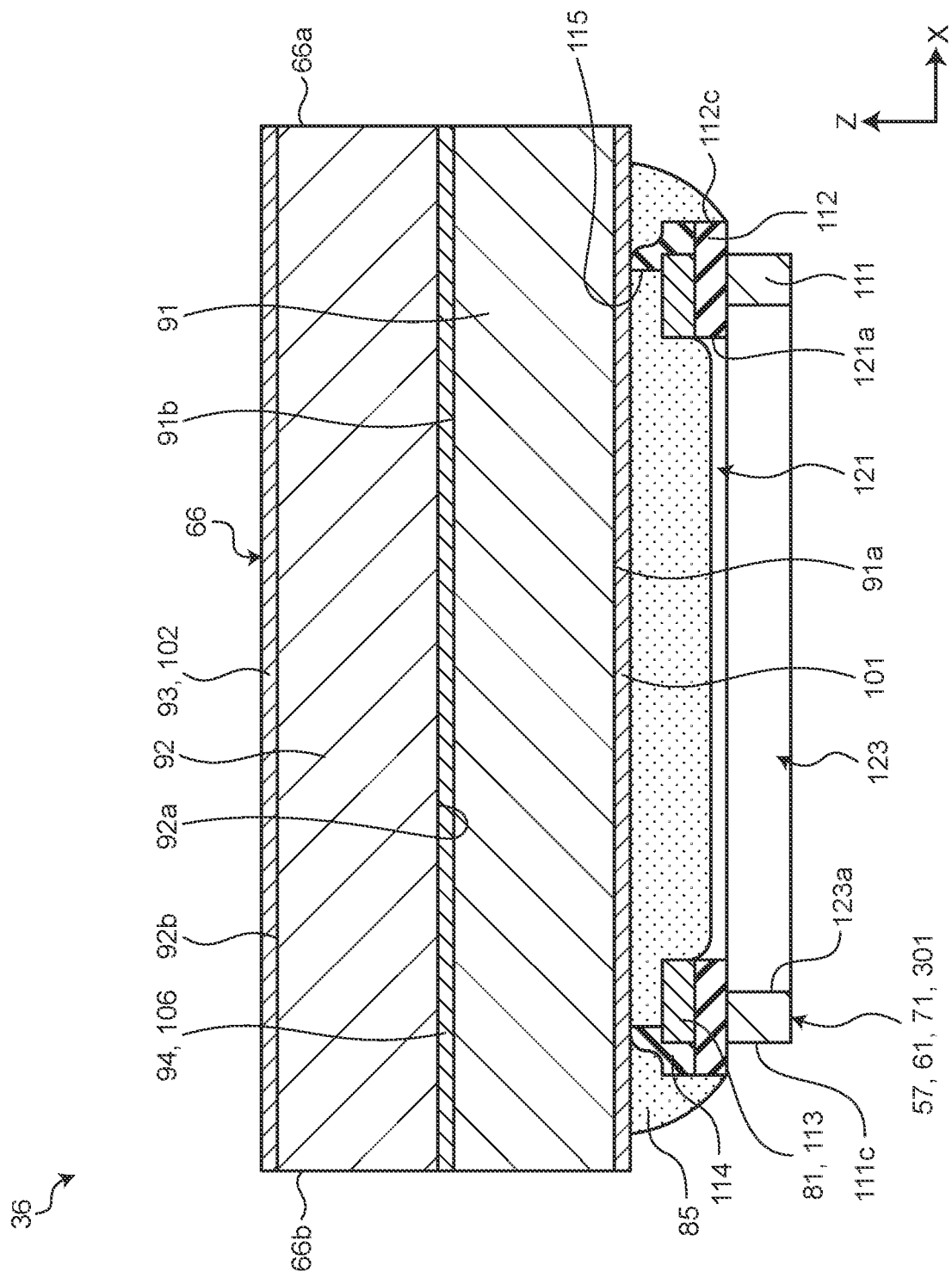
FIG. 8 is an exemplary cross-sectional view illustrating a part of the HGA of the third embodiment taken along line F8-F8 of FIG. 7.

In the following, a third embodiment will be described with reference to FIGS. 7 and 8. FIG. 7 is an exemplary plan view illustrating a part of an HGA 36 according to the third embodiment. FIG. 8 is an exemplary cross-sectional view illustrating a part of the HGA 36 of the third embodiment taken along line F8-F8 of FIG. 7.

As illustrated in FIG. 7, each of two MA attaching parts 71 in the third embodiment includes a first protrusion 301 and a second protrusion 302 instead of the first protrusion 76 and the second protrusion 77. The first protrusion 301 and the second protrusion 302 are substantially the same as the first protrusion 76 and the second protrusion 77 except for points as will be described below. The first protrusion 301 is an example of a protrusion.

The first protrusion 301 protrudes from a peripheral part 75 in the −Y direction, and is provided with a first pad 81. The second protrusion 302 protrudes from the peripheral part 75 in the +Y direction, and is provided with a second pad 82.

In the X direction, the first protrusion 301 has a width smaller than a second MA 66. In the X direction, the second protrusion 302 has a width smaller than the second MA 66. The X direction is a direction along a lower surface 91a and orthogonal to the −Y direction, and is an example of a fifth direction.

As illustrated in FIG. 8, in the X direction, a backing layer 111 of the first protrusion 301 has a width smaller than a base layer 112 of the first protrusion 301. An edge 111c of the backing layer 111 is spaced apart from an edge 112c of the base layer 112. Similarly, in the X direction, the backing layer 111 of the second protrusion 302 is smaller in width than the base layer 112 of the second protrusion 302.

When the second MA 66 is placed on a flexure 57, a first adhesive 85 is pressed and spreads along the second MA 66 and an outer surface 61a of the flexure 57. The first adhesive 85 reaches an end of the first protrusion 301 in the X direction before reaching side surfaces 66a and 66b of the second MA 66.

Between the end of the first protrusion 301 and the side surfaces 66a and 66b of the second MA 66 in the X direction, the second MA 66 is exposed without being covered with the first protrusion 301. For this reason, a flow rate of the first adhesive 85 that is crushed to spread is reduced, so that the first adhesive 85 is less likely to reach the side surfaces 66a and 66b of the second MA 66.

A part of the first adhesive 85 spreads along the first protrusion 301 in the X direction. For example, the first adhesive 85 spreads to the edge 112c of the base layer 112. However, because the edge 112c of the base layer 112 is spaced apart from the edge 111c of the backing layer 111, the first adhesive 85 is less likely to reach the backing layer 111.

In an HDD 10 according to the third embodiment described above, the flexure 57 includes the peripheral part 75 and the first protrusion 301. The first protrusion 301 protrudes from the peripheral part 75 in the −Y direction and is provided with the first pad 81. In the X direction along the lower surface 91a and orthogonal to the −Y direction, the first protrusion 301 is smaller in width than the second MA 66. When joining the second MA 66 to the first pad 81 with the first adhesive 85, the first adhesive 85 is pressed between the first pad 81 and a lower film 101 and partly spreads to the end of the first protrusion 301 along the outer surface 61a of the first protrusion 301. The lower surface 91a of the second MA 66 is not covered by the first protrusion 301 outside the end of the first protrusion 301. For this reason, the pressed and spread first adhesive 85 decreases in amount when reaching the end of the first protrusion 301. In other words, the first adhesive 85 can be avoided or restricted from spreading to an intermediate film 106 along the second MA 66. As a result, the HDD 10 according to the present embodiment can reduce the possibility that the lower film 101 and the intermediate film 106 are short-circuited due to the first adhesive 85.

In the X direction, the backing layer 111 is smaller in width than the base layer 112. This allows the pressed first adhesive 85 to be still apart from the backing layer 111 when reaching the edge 112c of the base layer 112, for example. Consequently, the HDD 10 according to the present embodiment can reduce the possibility that the lower film 101 and the backing layer 111 are short-circuited due to the first adhesive 85.

The above embodiments have been described mainly about the second MA 66. However, the pad on which the first MA 65 is mounted may be provided with at least one of the through holes 121, 122, 123, 125, 126, and 127 and the holes 201 and 205, as with the first pad 81 and the second pad 82. The through holes 122, 125, 126, and 127, and the holes 201 and 205 may be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a magnetic disk;
a magnetic head configured to read and write information from and to the magnetic disk;
a piezoelectric element including
a first piezoelectric body,
a first electrode disposed on a first surface of the first piezoelectric body,
a second electrode disposed on the first surface away from the first electrode in a first direction along the first surface, and
a third electrode disposed on a second surface of the first piezoelectric body and connected to the second electrode, the second surface being opposite to the first surface;
a flexure with a first through hole, on which the magnetic head is mounted, the flexure including
an outer surface facing the first electrode and the second electrode,
a first pad disposed on the outer surface, and
a second pad disposed on the outer surface away from the first pad in the first direction, the first through hole being open to a part of the first pad, the part with which the first electrode and the third electrode overlap in a second direction which the first surface faces;
a conductive, first bond that joins the first pad and the first electrode together and is partly accommodated in the first through hole; and
a conductive, second bond that joins the second pad and the second electrode together.

2. The disk device according to claim 1, wherein
the piezoelectric element has an end surface at an end in a third direction along the first surface and orthogonal to the first direction, and
the third electrode is exposed to an outside of the piezoelectric element at least at the end surface.

3. The disk device according to claim 1, wherein
the flexure is provided with a first hole, and
the first hole opens to the first pad away from the third electrode along the outer surface in a fourth direction opposite to the first direction.

4. The disk device according to claim 3, wherein
the first hole penetrates the flexure.

5. The disk device according to claim 3, wherein
the flexure includes
a metal plate,
a first insulating layer,
a second insulating layer interposed between the metal plate and the first insulating layer, and
a conductive layer interposed between the first insulating layer and the second insulating layer,
the conductive layer includes the first pad,
the first hole penetrates the first pad, and
the second insulating layer closes the first hole.

6. The disk device according to claim 3, wherein
the first through hole has a cross-sectional area larger than the first hole.

7. The disk device according to claim 1, wherein
the piezoelectric element includes a second piezoelectric body and a fourth electrode,
the second piezoelectric body has a third surface attached to the second surface,
the fourth electrode is disposed on a fourth surface of the second piezoelectric body and connected to the first electrode, the fourth surface being opposite to the third surface,
the flexure is provided with a second through hole open to a part of the second pad, the part with which the second electrode and the fourth electrode overlap in the second direction, and
the second bond is partly accommodated in the second through hole.

8. The disk device according to claim 7, wherein
the flexure is provided with a second hole, and
the second hole opens to the second pad away from the fourth electrode along the outer surface in the first direction.

9. The disk device according to claim 7, wherein
the second through hole has a cross-sectional area smaller than the first through hole.

10. The disk device according to claim 1, wherein
the flexure includes a base, and a protrusion protruding from the base in the first direction, and
the protrusion has a width smaller than the piezoelectric element in a fifth direction along the first surface and orthogonal to the first direction.

11. The disk device according to claim 10, wherein
the protrusion includes
a metal plate,
a first insulating layer,
a second insulating layer interposed between the metal plate and the first insulating layer, and
a conductive layer interposed between the first insulating layer and the second insulating layer,
the conductive layer includes the first pad, and
the metal plate has a width smaller than the second insulating layer in the fifth direction.

12. The disk device according to claim 1, wherein
the flexure includes
a metal plate,
a first insulating layer,
a second insulating layer interposed between the metal plate and the first insulating layer, and
a conductive layer interposed between the first insulating layer and the second insulating layer,
the conductive layer includes the first pad,
the first through hole penetrates the second insulating layer and the first pad,
the metal plate is provided with a third through hole communicating with the first through hole, and
the third through hole has an edge surrounding the first through hole with spacing from an edge of the first through hole.

13. The disk device according to claim 1, wherein
the flexure includes
a metal plate,
a first insulating layer,
a second insulating layer interposed between the metal plate and the first insulating layer, and
a conductive layer interposed between the first insulating layer and the second insulating layer, and
the first bond is partly attached to a part of the flexure, the part including the metal plate in a sixth direction which the outer surface faces.

14. The disk device according to claim 1, wherein
the first pad is set to a ground potential, and
the piezoelectric element is configured to expand or contract in the first direction by an applied voltage to the second electrode.

15. A disk device comprising:
a magnetic disk;
a magnetic head configured to read and write information from and to the magnetic disk;
a piezoelectric element including
a piezoelectric body,
a first electrode disposed on a first surface of the first piezoelectric body,
a second electrode disposed on the first surface away from the first electrode in a first direction along the first surface, and
a third electrode disposed on a second surface of the piezoelectric body and connected to the second electrode, the second surface being opposite to the first surface;
a flexure with a through hole, on which the magnetic head is mounted, the flexure including
an outer surface facing the first electrode and the second electrode,
a first pad disposed on the outer surface, and
a second pad disposed on the outer surface away from the first pad in the first direction, the through hole being open to the first pad between an end and a center of the first pad in the first direction;
a conductive, first bond that joins the first pad and the first electrode together and is partly accommodated in the through hole; and
a conductive, second bond that joins the second pad and the second electrode together.

* * * * *